United States Patent [19]
Wildi

[11] 3,820,002
[45] June 25, 1974

[54] NON-SATURATING AC/DC POWER SUPPLY

[75] Inventor: Theodore Wildi, Quebec, Canada

[73] Assignee: Lab-Volt (Quebec) Limited, Quebec, Canada

[22] Filed: Feb. 24, 1970

[21] Appl. No.: 13,432

[52] U.S. Cl................ 321/5, 321/16, 321/27 R, 323/43.5 R, 336/148
[51] Int. Cl.................................................. H02m
[58] Field of Search............... 321/5, 8, 16, 27, 47; 323/43.5 X, 45; 307/82; 336/148

[56] References Cited
UNITED STATES PATENTS

| | | | |
|---|---|---|---|
| 2,800,621 | 7/1957 | Carlson et al. | 321/27 X |
| 2,881,383 | 4/1959 | Michaelis | 321/27 |
| 3,254,291 | 5/1966 | Vaughan | 323/43.5 X |

*Primary Examiner*—William H. Beha, Jr.
*Attorney, Agent, or Firm*—Raymond A. Robic

[57] ABSTRACT

An AC/DC power supply for use with a polyphase AC power source having a common neutral terminal comprising a poly-phase autotransformer including star connected single-phase autotransformers, each single-phase autotransformer having one terminal adapted for connection to each phase of said polyphase AC power source, and a common neutral terminal adapted for connection to the common neutral terminal of the polyphase AC power source. Simultaneously movable tap connections are located one on each single-phase autotransformer, said tap connections dividing each single-phase autotransformer into two sections of varying ratio for providing a variable AC power supply. Similarly polarized diodes are connected at one terminal to eahh tap connection and at the other terminal to a common output terminal for providing a variable DC power supply between such output terminal and the common neutral terminal.

5 Claims, 3 Drawing Figures

INVENTOR
Theodore WILDI

ATTORNEY

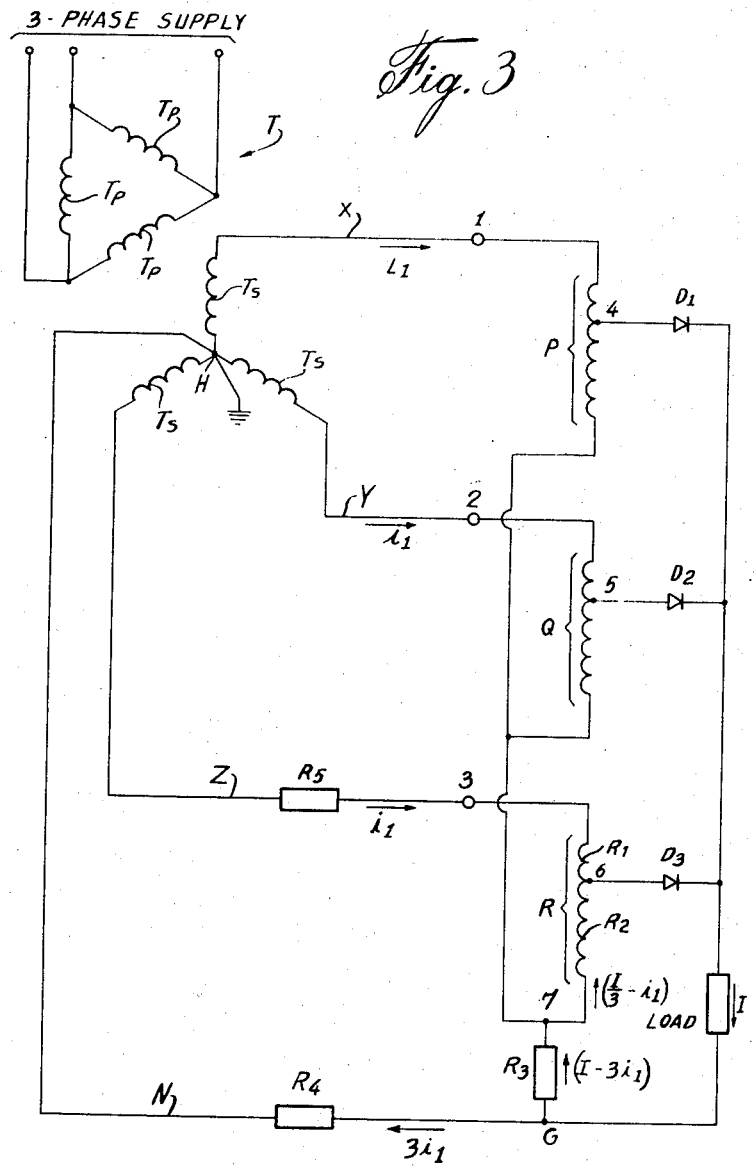

NON-SATURATING AC/DC POWER SUPPLY

This invention relates to a large-power variable AC/DC power supply.

Electrical power laboratories in schools and universities are generally set up to service a number of student work stations, where experiments are carried out. The power required is generally more than that encountered in an electronics lab, and where experiments on motors and generators are to be performed, the requirements are easily in the kilowatt range.

The large power requirement encouraged the installation of a central power and distribution panel from which AC and DC power was fed to the various work stations, using appropriate wire and cable. Three-phase, three-wire and DC power necessitated running at least five conductors from the central distribution panel to each work station, and on grounded three-phase 4-wire systems, six conductors were required.

Owing to the variety of experiments, the central power and distribution panel usually contained at least two DC sources, one typically rated at 120 volts, and the other at a lower value such as 6, 12 or 24 volts. Depending upon the work station requirements, the desired voltage could be "patched" from the appropriate supply. Some of the more elaborate central power and distribution panels offered a multiplicity of AC and DC voltages in an attempt to meet the various experimental requirements.

This central power and distribution panel concept has the following drawbacks:

1. It is expensive to purchase and install.
2. The various student groups have a very limited choice of supply voltages available to them.
3. The various student groups will usually be connected to the same AC or the same DC power supply, with the result that voltage fluctuations caused by load variations in one area of the lab are necessarily felt by all. The voltmeter and ammeter readings are not steady.
4. A further complication is introduced by the voltage changes produced by the electric Power Utility itself. It is usually difficult to maintain "rated voltage" conditions for very long.
5. Another problem is the line voltage drop from the central distribution panel to the work station. This drop varies with the work station load, so that even if the voltage were constant at the panel, it would vary with load at the site of the experiment. (Oversize conductors are usually installed to minimize this drop).

In some special laboratories, these deficiencies were overcome by installing a three-phase variable autotransformer at the work station itself. This permitted complete control of AC voltage from zero to maximum at every student position.

Provision for a variable DC supply at every work station was however prohibitive, because considerable DC power was involved, and the installation of a variable autotransformer, isolating transformer and bridge-connected rectifier was generally too costly and cumbersome to consider.

It is therefore the main feature of the invention to provide a variable AC/DC supply which can be obtained very economically at every working position, making use of the same variable autotransformers that would normally be used to obtain variable polyphase AC power.

It is a further object of this invention to eliminate the need for a central power and distribution panel containing a variety of voltage sources together with provision to path them to the various work stations in a laboratory.

It is another object of this invention to require only standard 3-phase, 4-wire polyphase outlets at each student work station to which the variable AC/DC power supply may be connected.

It is a further object of this invention in the interest of safety, that the variable DC supply has, an one of its terminals, the common neutral (and ground) of the polyphase AC power source.

The AC/DC power supply, in accordance with the invention, for use with a polyphase AC power source having a common neutral terminal comprises: a polyphase autotransformer including star connected single-phase autotransformers, each single-phase autotransformers having one terminal adapted for connected to each phase of said polyphase AC power source and a common neutral terminal adapted for connection to the common neutral terminal of said polyphase AC power source; simultaneously variable tap connections located one on each single-phase autotransformer, said tap connections dividing each single-phase autotransformer into two sections of varying ratio for providing a variable AC power supply; and similarly polarized diodes connected at one terminal to each tap connection and at the other terminal to a common output terminal for providing a variable DC power supply between said output terminal and said common neutral terminal.

Each single-phase autotransformer is connected to a polyphase source through a line connection having a certain resistance. When the sum of the line resistance and the internal resistance of the polyphase source for each phase is negligeable compared to the resistance of each single-phase autotransformer, the DC current flowing through each diode will divide itself proportionally between each section of each single-phase autotransformer at the tap connection thus causing the ampere-turns in the two sections of each single-phase autotransformer to oppose each other exactly, thereby eliminating any net DC magnetic saturation.

When the sum of the line resistance and the internal resistance of the polyphase source for each phase is appreciable as compared to the resistance of each single-phase autotransformer, a compensating resistor is connected in series with the neutral point of the ganged single-phase autotransformers, thereby forcing the DC current flowing through each diode to divide itself proportionally between each section of each single-phase autotransformer at the tap connection. The ampere-turns in the two sections will then oppose each other exactly, eliminating any appreciable DC saturation in the autotransformer.

The invention will now be disclosed with reference to the accompanying drawings which illustrate preferred embodiments of the invention and in which:

FIG. 3 illustrates a second embodiment of the invention in which a compensating resistor is inserted in series with the neutral point of the ganged autotransformers.

Figure 1:
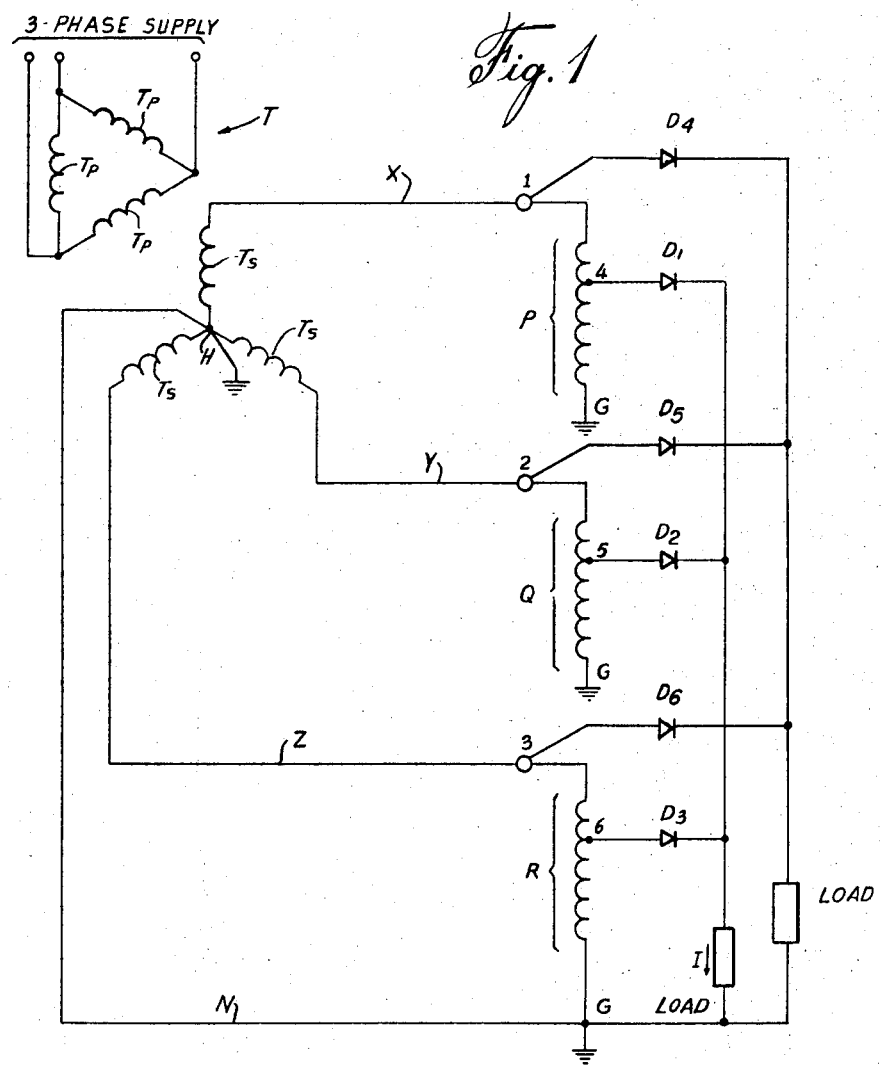
FIG. 1 illustrates a DC power supply in accordance with the invention.

FIG. 1 shows a distribution system composed of a main transformer T having delta connected primary windings $T_p$ and star connected secondary windings $T_s$. Primary windings $T_p$ are connected to a suitable source of three-phase voltage. From the secondary windings $T_s$ of the transformer, lines X, Y and Z as well as neutral line N are carried to terminals 1, 2, 3 and G located at a typical working position in a laboratory. A variable autotransformer composed of three ganged single-phase autotransformers, P, Q and R are situated at this working position. The tap-off points 4, 5 and 6 are simultaneously moved as the handle of the variable autotransformer is turned. This action provides a variable alternating voltage (zero to maximum) between terminals 4-G, 5-G and 6-G.

Assuming that the output voltage of secondary windings $T_s$ is the commercial 120 volts per phase or 208 volts phase to phase, it is therefore possible to obtain between points 4, 5 and 6 and the neutral point G a three-phase voltage which can be varied from 0–120 volts per phase, or from 0–208 volts phase to phase.

In order to obtain a DC output, diodes $D_1$, $D_2$ and $D_3$ are connected to tap-off points, 4, 5 and 6. Theoretical considerations prove that in the absence of voltage drop and commutation effects, the approximate DC voltage across the load will be 140 volts when contacts 4, 5 and 6 touch respectively terminals 1, 2 and 3.

It is clear that if the autotransformer is turned from its minimum to its maximum position, the DC output voltage will also vary from 0–140 volts. This is a very desirable state of affairs because many DC motors and generators and other electrical equipment have 120 volts as a standard DC voltage. The fact that it is possible to exceed this voltage by some 15 percent is a definite advantage.

However, the use of autotransformers in such a system raises the problem of DC magnetic saturation which could seriously impair their satisfactory operation. Thus, the DC current which is delivered by the autotransformer could cause magnetic saturation of the core which in turn, could raise the magnetizing current to such an extent as to cause overheating and the three ganged single-phase autotransformers P, Q and R.

The following analysis will determine that there is automatic cancellation of the DC component of magnetomotive force in each single-phase autotransformer, provided that the sum of the line resistance and the transformer secondary winding resistance for each phase is negligible compared to the resistance of each single-phase autotransformer.

Figure 2:
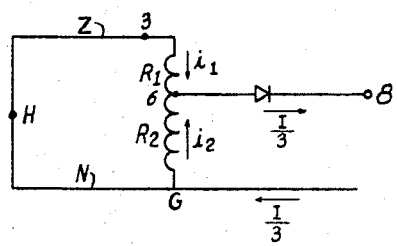
FIG. 2 illustrates a portion of the DC power supply of FIG. 1 for the analysis of the DC current flowing through one of the autotransformers.

Let us consider one of the single-phase autotransformers R shown in more detail in FIG. 2. If we assume that the sum of the line resistance 3 ZH (which includes the transformer winding of one phase) and the line resistance GNH is negligible with respect to the resistance of autotransformer R, then the connection between points 3 and G is substantially a short-circuit, as illustrated in FIG. 2.

If we further assume that the direct component of current in the load is I amperes, then the direct current in each diode $D_1$, $D_2$, $D_3$ will be I/3. Referring to FIG. 2, when current I/3 comes to the junction point 6, it will divide into two parts $i_1$ and $i_2$ in such way that $i_1 R_1 = i_2 R_2$. This relationship is a direct result of Kirchoff's law. $R_1$ and $R_2$ are the resistances of the autotransformer sections between points 3–6 and 6-G respectively.

It will be noted, however, that owing to the construction of the autotransformer the resistances $R_1$ and $R_2$ are also directly proportional to the number of turns $N_1$ and $N_2$ in sections 3–6 and 6-G respectively. It follows therefore that $i_1 N_1 = i_2 N_2$. Furthermore, the ampere-turns in these two sections oppose each other so that there is no DC saturation in the autotransformer.

It is clear that this relationship will hold no matter where the tap-off point 6 happens to be. This means that a variable DC voltage can be supplied to a load using autotransformers without causing any saturation in the core. The only requirement is that the line resistance including the main transformer secondary winding resistance for each phase be negligible compared to that of the autotransformer.

Direct current will flow in each secondary winding $T_s$ of transformer T but provisions can be made to neutralize its effect at that point if desired. Techniques to do this are well known.

If each secondary winding $T_s$ of the main transformer and the supply lines 3 ZH and GNH do not have negligible resistances as compared to the resistance of the autotransformer R, it is still possible to eliminate DC saturation in the autotransformer by introducing a suitable resistor $R_3$ as shown in FIG. 3. In this figure:

$R_1$ = resistance of section 3–6 of the autotransformer winding;

$R_2$ = resistance of section 6–7 of the autotransformer winding;

$R_3$ = compensating resistance whose value is to be determined;

$R_4$ = resistance of line GNH;

$R_5$ = resistance of line 3ZH including one secondary winding of transformer T;

$N_1$ = turns in section 3–6 (proportional to $R_1$);

$N_2$ = turns in section 6–7 (proportional to $R_2$);

I = DC load current;

I/3 = DC current supplied by each diode;

$i_1$ = DC current in each supply line X,Y,Z;

$3i_1$ = DC current in neutral line N;

$(I - 3i_1)$ = DC current in resistance $R_3$;

$(I/3 - i_1)$ = DC current in section 6–7 (also in sections 4–7 and 5–7 respectively).

The current distribution in the three supply lines X, Y, Z and in each single-phase autotransformer, P, Q and R, will be the same because of the symmetry of the circuit.

Now, according to Kirchoff's law, for the closed loop 63ZHNG76 we have:

$$i_1 (R_1 + R_5) + 3i_1 R_4 - R_3 (I - 3i_1) - (I/3 - i_1) R_2 = 0 \quad (1)$$

Simplifying we get:

$$i_1 (R_1 + R_2 + R_5 + 3 R_3 + 3 R_4) = I (R_3 + R_2/3) \quad (2)$$

On the other hand, in order to eliminate DC saturation, we must have:

$$i_1 N_1 = (I/3 - i_1) N_2 \quad (3)$$

which is to say that $$i_1 R_1 = (I/3 - i_1) R_2 \quad (4)$$

because the resistances of the windings are proportional to the number of turns.

Combining equations (2) and (4) and simplifying we find that $$(R_3 = R_2/3R_1) (R_5 + 3R_4) \quad (5)$$

The value of compensating resistor $R_3$ will therefore depend upon $R_4$ and $R_5$ and also upon the position of the tap-off point 6.

Ideally, $R_3$ should be variable between limits dictated according to equation (5). In practice, we can usually employ a fixed value for $R_3$, determined so as to get zero DC saturation at a specified DC output voltage, say 120 volts. Thus, in order to obtain 120 volts DC from the 120/208 VAC system, it can be shown that $N_2/N_1$ and hence $R_2/R_1$ should be equal to 6 approximately. The value of $R_3$ can then be set to $$R_3 = 2\,(R_5 + 3\,R_4)$$

FOr lower settings of tap-off points and consequently lower DC output voltages, there will be some degree of DC saturation, and a consequent increase in magnetizing current. Balanced against this is the fact that the AC power component of the line current $i_1$ decreases owing to the smaller transformer ratio as the tap point 6 approaches winding terminal 7. Thus, for a given DC output current, there will not be over-heating of the auto-transformer for tap-off points removed from the ideal "zero-saturation" set point.

It should be noted that resistance $R_3$ could be replaced by three individual resistances introduced in series with sections 6–7, 5–7 and 4–7 respectively, and short-circuiting points 7 and G in FIG. 3. This solution is not however as advantageous as the former. Each individual resistance would require a value three times as large as the value of $R_3$ given by equation (5).

It will be noted that when AC power is supplied to a balanced three-phase load connected to points 4, 5 and 6, the AC current in $R_3$ in zero and consequently, the presence of $R_3$ is not felt. As a result, $R_3$ does not affect the output impedance of the power supply when it supplies three-phase loads.

It will be appreciated that both the three-phase AC and the DC output have a common neutral or grounding point G.

Fixed-voltage AC power can be taken from points 1, 2 and 3, and again point G will act as a common neutral and ground.

Fixed voltage DC power can be obtained by connecting three similarly polarized diodes D4, D5 and D6 respectively to points 1, 2 and 3 and otherwise connecting them in a manner identical to that shown for diodes D1, D2 and D3 as illustrated in FIG. 1. Again, point G will act as the common ground for this fixed supply.

I claim:

1. An AC/DC power supply comprising:
  a. a polyphase AC power source including a main transformer having primary and secondary windings, the secondary windings being star connected and having a common neutral terminal;
  b. a polyphase autotransformer including star connected single-phase autotransformers, each single-phase autotransformer having one terminal connected to each secondary winding of said polyphase AC Power source and a common neutral terminal connected to the common neutral terminal of said secondary windings of said polyphase AC power source;
  c. simultaneously movable tap connections located one on each single-phase autotransformer, said tap connections dividing each single-phase autotransformer into two sections of varying ratio for providing a variable AC power supply; and
  d. similarly polarized diodes connected at one terminal to each tap connection and at the other terminal to a common output terminal for providing a variable DC power supply between said output terminal and said common neutral terminal, each single-phase autotransformer being connected to each secondary winding of said polyphase source through a line connection having a certain resistance, and wherein the sum of said line resistance and the internal resistance of the secondary winding of said polyphase source for each phase is appreciable as compared to the resistance of each single-phase autotransformer, and further comprising a compensating resistor connected in series with one of the sections of each single-phase autotransformer for causing the DC current flowing through each diode to divide itself proportionally between each section of each single-phase autotransformer at each tap connection thus causing the ampere-turns of the two sections to oppose each other without creating any appreciable DC saturation in the polyphase autotransformer.

2. An AC/DC power supply as defined in claim 1, wherein said compensating resistor is connected in series between said common neutral terminal of said single-phase autotransformers and said common neutral terminal of the secondary windings of said polyphase AC power source.

3. An AC/DC power supply as defined in claim 1, wherein said polyphase AC power source is a three-phase source and said polyphase autotransformer is a three-phase autotransformer.

4. An AC/DC power supply as defined in claim 1, further comprising means for providing a fixed polyphase AC output voltage from each phase of said polyphase source.

5. An AC/DC power supply as defined in claim 1, further comprising additional similarly polarized diodes connected at one terminal to each phase of said polyphase AC power source and at the other terminal to a common output terminal for providing a fixed DC power supply between said last-mentioned output terminal and said common neutral terminal.

\* \* \* \* \*